US010330786B1

(12) United States Patent
Musgrove

(10) Patent No.: US 10,330,786 B1
(45) Date of Patent: Jun. 25, 2019

(54) SPECTRAL NOTCH INTERFERENCE MITIGATION FOR STRETCH PROCESSING SYNTHETIC APERTURE RADAR

(71) Applicant: National Technology & Engineering Solutions of Sandia, LLC, Albuquerque, NM (US)

(72) Inventor: Cameron Musgrove, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 357 days.

(21) Appl. No.: 15/298,701

(22) Filed: Oct. 20, 2016

Related U.S. Application Data

(60) Provisional application No. 62/254,634, filed on Nov. 12, 2015.

(51) Int. Cl.
*G01S 7/02* (2006.01)
*G01S 13/90* (2006.01)

(52) U.S. Cl.
CPC .......... *G01S 13/9035* (2013.01); *G01S 7/023* (2013.01); *G01S 13/90* (2013.01)

(58) Field of Classification Search
CPC .. G01S 13/90; G01S 13/9017; G01S 13/9023; G01S 13/9029; G01S 13/9035; G01S 13/9094; G01S 2013/9041–9088; G01G 13/9011
See application file for complete search history.

(56) References Cited

U.S. PATENT DOCUMENTS

| 5,969,662 | A | * | 10/1999 | Hellsten | G01S 7/003 342/179 |
| 6,028,549 | A | * | 2/2000 | Buckreuss | G01S 7/36 162/196 |
| 6,072,419 | A | * | 6/2000 | Normant | G01S 13/282 342/194 |
| 6,166,678 | A | | 12/2000 | Jao | |
| 6,426,718 | B1 | * | 7/2002 | Ridgway | G01S 13/534 342/159 |

(Continued)

*Primary Examiner* — Peter M Bythrow
(74) *Attorney, Agent, or Firm* — Medley, Behrens & Lewis, LLC

(57) ABSTRACT

Various technologies for mitigating interference in stretch-processed SAR imagery are described herein. Stretch-processed SAR data is received at a computing device. The stretch-processed (or deramped) SAR data is then reramped, thereby removing frequency-variant components of narrowband interference signals in the deramped data. A frequency-domain transform is executed over the reramped data to generate a spectral characteristic of the reramped data. A spectral notch filter is applied to frequency bands corresponding to the peaks of the spectral characteristic in order to filter out the narrowband interference signals. An inverse frequency-domain transform can then be executed over the filtered spectral characteristic to return to a phase-history representation of the SAR data. The phase history resulting from the inverse frequency-domain transform is a ramped phase history, which can then be deramped prior to use in connection with generating images of the scanned scene.

20 Claims, 4 Drawing Sheets

(56) References Cited

U.S. PATENT DOCUMENTS

| | | | |
|---|---|---|---|
| 6,836,240 B1* | 12/2004 | Dubbed | ............... G01S 7/282 |
| | | | 342/194 |
| 7,551,118 B2 | 6/2009 | Hellsten | |
| 7,812,758 B2 | 10/2010 | Morris | |
| 8,259,003 B2 | 9/2012 | Song | |
| 8,400,349 B1 | 3/2013 | Dubbert et al. | |
| 2005/0104763 A1* | 5/2005 | Hall | ................. G01S 7/4021 |
| | | | 342/25 A |
| 2009/0091492 A1 | 4/2009 | Sanyal et al. | |
| 2009/0121926 A1* | 5/2009 | Iverson | ............. G01S 13/9035 |
| | | | 342/25 B |
| 2013/0244710 A1* | 9/2013 | Nguyen | ............ G01S 13/0209 |
| | | | 455/501 |
| 2014/0347213 A1* | 11/2014 | Nguyen | ................ H04B 15/00 |
| | | | 342/25 F |
| 2016/0341814 A1* | 11/2016 | Nguyen | ............ G01S 13/0209 |

\* cited by examiner

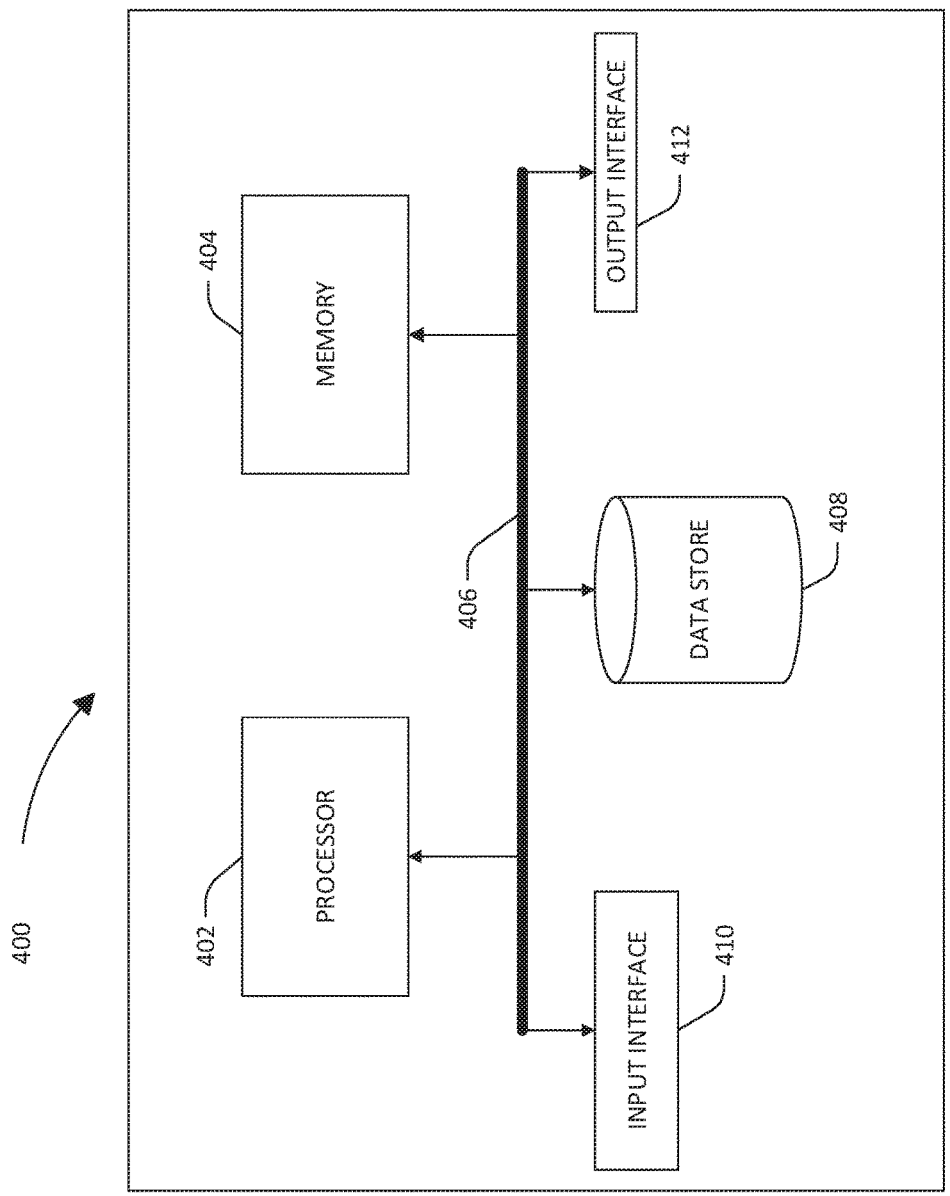

SPECTRAL NOTCH INTERFERENCE MITIGATION FOR STRETCH PROCESSING SYNTHETIC APERTURE RADAR

RELATED APPLICATION

This application claims priority to U.S. Provisional Patent Application No. 62/254,634, filed on Nov. 12, 2015, and entitled "SPECTRAL NOTCH INTERFERENCE MITIGATION FOR STRETCH PROCESSING SYNTHETIC APERTURE RADAR", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Synthetic aperture radar (SAR) is used to create images of landscapes and other scenes. Aircraft equipped with SAR can fly over an area of interest and collect SAR data that can be used to image the area. Various sources of interference, such as radio frequency transmitters, weather radar stations, television transmission antennae, etc., may be present in the area of interest. Electromagnetic emissions from these sources of interference are often received simultaneously with a desired radar echo return by SAR antennae. Thus, SAR data collected by a SAR antenna frequently includes both the desired radar echo return and additional interference. When images are generated from the SAR data, the interference creates undesirable image artifacts. Conventional techniques for removing interference artifacts from SAR data can cause further degradation in image quality of images generated from the SAR data.

SUMMARY

The following is a brief summary of subject matter that is described in greater detail herein. This summary is not intended to be limiting as to the scope of the claims.

Various technologies for mitigating interference in stretch-processed SAR imagery while preserving image quality are described herein. In an exemplary embodiment, stretch-processed SAR data is received at a computing device, wherein the SAR data is derived from scans of a scene by a SAR antenna. The stretch-processed (or deramped) SAR data is then reramped, thereby removing frequency-variant components of narrowband interference signals in the deramped SAR data. A frequency-domain transform is executed over the reramped data to generate a spectral characteristic of the reramped data. Narrowband interference signals can be identified as corresponding with peaks of the spectral characteristic of the reramped data. A spectral notch filter is applied to frequency bands corresponding to the peaks of the spectral characteristic in order to filter out the narrowband interference signals. An inverse frequency-domain transform can then be executed over the filtered spectral characteristic to return to a phase-history representation of the SAR data. The phase history resulting from the inverse frequency-domain transform is a ramped phase history, which can then be deramped prior to use in connection with generating images of the scanned scene.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is an exemplary computing system.

DETAILED DESCRIPTION

Figure 1:
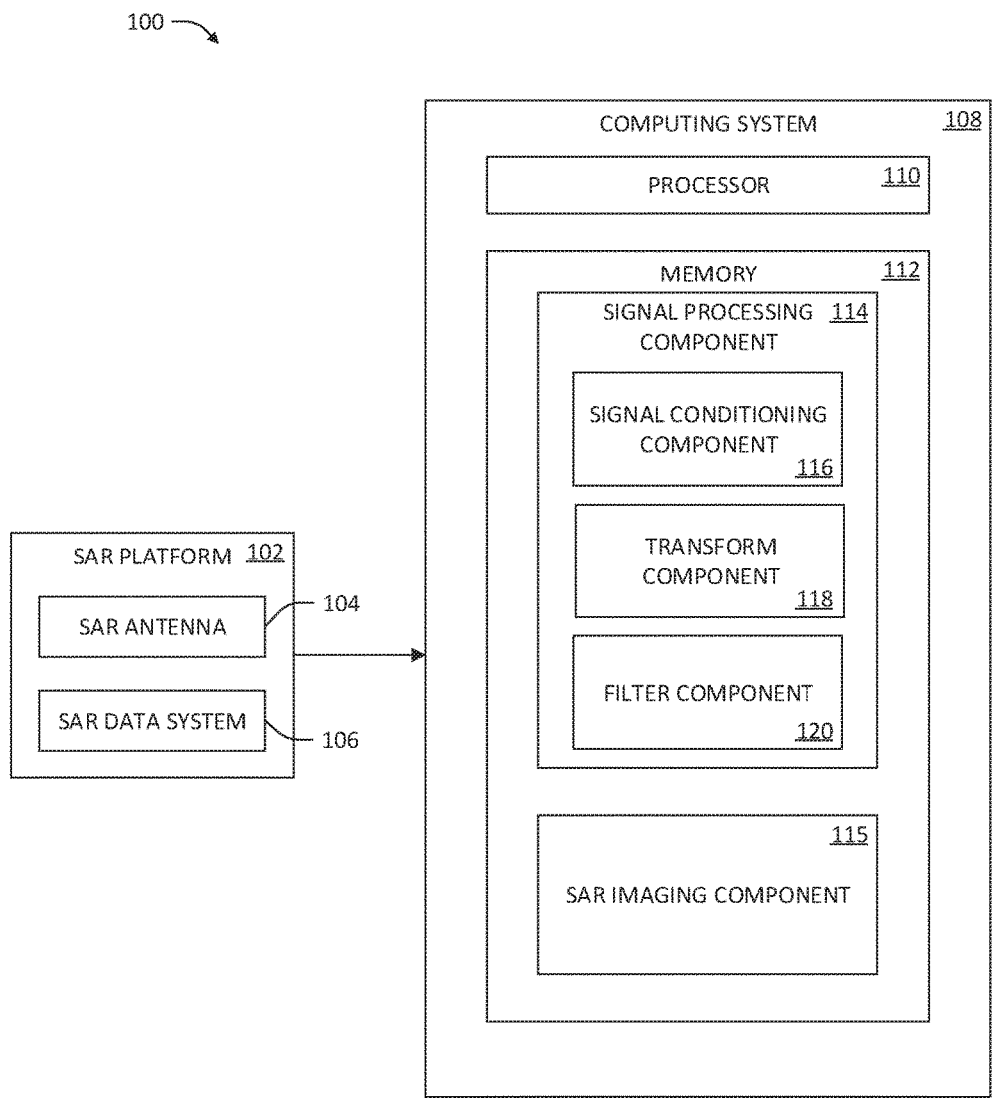
FIG. 1 is a functional block diagram of an exemplary system that facilitates mitigation of interference in stretch-processed SAR data.

Various technologies pertaining to interference mitigation in stretch-processing SAR data are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates interference mitigation for stretch-processed SAR imagery is illustrated. The system 100 includes a SAR platform 102, such as an aircraft, on which is mounted a SAR antenna 104. As the SAR platform 102 traverses an area of interest, the SAR antenna 104 emits chirped scanning pulses of electromagnetic (EM) radiation. The chirped pulses are frequency-variant signals. For example, the SAR antenna 104 can emit a pulse of EM radiation having a frequency that varies at a constant rate from a first frequency to a second frequency, wherein the first frequency and the second frequency comprise a high-frequency end and a low frequency end, respectively, of a bandwidth of the SAR antenna 104. The SAR antenna 104 receives EM return echo pulses comprising scanning pulses that are reflected back to the antenna 104 by terrain and other objects in the area. The return echo pulses are then provided to a SAR data system 106 that digitally samples the return echo pulses and performs stretch-processing on the resulting digitally-sampled data. The SAR data system 106 can store such data for a plurality of return echo pulses, and the data for the plurality of pulses can be used in connection with generating SAR imagery of a scene in the area of interest.

Images generated from SAR data can contain undesirable artifacts from interference that can arise during the process of data collection by the SAR antenna 104. In particular, emissions from sources of narrowband EM interference such as, for example, radio and television antennae and ground-based radar, can be picked up by the SAR antenna 104. These emissions are received by the SAR antenna 104 simultaneously with the return echo pulses reflected by objects and terrain in the area in which data is collected. Thus, a presence of EM emitters in the area of interest can degrade image quality of SAR images by interfering with the EM echo pulses that are desirably received by SAR antennae.

Stretch processing can be used with radar systems that emit chirped radar signals (i.e., frequency-variant signals) in order to reduce a digital sampling rate required to sample a chirped signal of a given bandwidth, thereby potentially reducing cost and complexity of radar processing equipment. In stretch-processing radar systems, however, narrowband interference signals become wideband signals. In stretch processing, or deramping, a received echo return pulse received by a radar antenna is mixed with a copy of a scanning pulse transmitted by the radar antenna. The received echo return comprises 1) a chirped echo of the transmitted radar pulse—as reflected back to the antenna by objects in the scene—and 2) the non-chirped interference signal. When the received echo return pulse is mixed with the copy of the transmitted pulse, the chirped (i.e., frequency-variant) components of the received echo and the transmitted copy cancel, whereas the non-chirped interference signal becomes chirped across the bandwidth of the radar transmission. Therefore, after stretch processing, the interference signal cannot be directly filtered in the frequency domain because frequency components of the interference signal are spread across the frequency spectrum of the radar during stretch processing. Furthermore, sinusoidal echo return signals from all objects in a field of view of the SAR antenna 104 are present throughout an entire phase history of the echo return. Hence, applying a standard notch to a phase-history domain signal in order to filter an interference component introduces magnitude and phase discontinuities in the sinusoidal echo returns. These discontinuities cause image distortion when the phase history is used to generate SAR imagery.

The exemplary system 100 therefore further comprises a computing system 108 configured to analyze stretch-processed echo return pulses received from the SAR data system 106, and to identify and filter interference signals using a spectral notch filter. The computing system 108 comprises at least one processor 110 and memory 112. The memory 112 comprises a signal processing component 114 that, when executed by the at least one processor 110, processes the deramped SAR data received by the computing system 108 from the SAR data system 106 in order to filter out narrowband interference. The narrowband interference can be, for example, signals having a bandwidth less than 20% of a bandwidth of scanning pulses transmitted by the SAR antenna 104. It is to be understood, however, that functionality that is described as being carried out by the SAR data system 106 on the SAR platform 102 can be carried out by the signal processing component 114 or vice versa. The memory 112 further comprises a SAR imaging component 115 that receives filtered phase history data from the signal processing component 114 and generates images of a scene based upon the phase history data.

The signal processing component 114 comprises a signal conditioning component 116 that conditions deramped SAR data in preparation for frequency-domain spectral analysis. The signal processing component 114 further comprises a transform component that executes a transformation algorithm over conditioned SAR data from the signal conditioning component 116 in order to generate a spectral characteristic pertaining to the conditioned data. The signal processing component 114 also includes a filter component 120 that identifies frequency bands corresponding to interference in the echo return signals received by the SAR antenna 104. The filter component 120 then applies a notch filter to the identified frequency bands to filter out interference signals.

Details of operation of the computing system 108 are now described. The signal conditioning component 116 receives a deramped (i.e., stretch-processed) phase history pulse from the SAR data system 106. The deramped phase history pulse corresponds to an echo return pulse received by the SAR antenna 104 responsive to the antenna 104 emitting a chirped radar pulse. The deramped phase history pulse therefore comprises an unchirped version of the echo return pulse as well as a chirped interference signal, since stretch processing cancels a frequency-variant component of the echo return and introduces a frequency-variant component to constant-frequency signals. The signal conditioning component 116 can upsample the deramped phase history pulse to an RF bandwidth of the SAR antenna 104 in order to increase a number of data points for calculations in subsequent processing steps. The signal conditioning component 116 then reramps the upsampled phase history. The signal conditioning component 116 can reramp the phase history by multiplying the deramped phase history by a copy of the chirped scanning pulse emitted by the SAR antenna 104 during data collection. By reramping the phase history, the signal conditioning component 116 removes a chirp component on the interference signal that was introduced as a result of initial stretch-processing by the SAR data system 106. The reramping of the phase history by the signal conditioning component 116 also adds a chirp to the echo return pulse. The reramped phase history is then received by the transform component 118.

The transform component 118 executes a frequency-domain transform, such as a fast Fourier transform (FFT), over the reramped phase history, and outputs a frequency-domain spectral characteristic of the reramped phase history. Power of each of the signal components of the reramped phase history (echo return and interference) is preserved through the transform operation. Hence, a total power of the echo return is spread over the whole of the RF spectrum of the SAR antenna 104 when the transform component 118 executes the transform, while a total power of the interference signal is limited to the narrowband of the original interference source's emission. In general, therefore, the magnitude of a frequency band of the spectral characteristic that corresponds to the interference signal will be several times higher than the magnitude of bands of the spectral characteristic corresponding to the echo return. As a result, the filter component 120 can identify a frequency band at a peak of the spectral characteristic as corresponding to an interference signal. The filter component 120 can, for example, identify that a frequency band of the spectral characteristic corresponds to an interference signal based upon identifying that a magnitude of the spectral characteristic in the frequency band is at least two times higher than an average magnitude of the spectral characteristic outside the frequency band. The filter component 120 then applies a notch filter to the identified frequency band. Thus, the filter component 120 suppresses frequency components of the spectral characteristic corresponding to a narrowband interference signal. It is to be understood that the filter component 120 can identify a plurality of frequency bands corresponding to a plurality of respective interference signals. The filter component 120 can apply a separate notch filter to each of the plurality of frequency bands in the spectral characteristic in order to suppress frequency components of the spectral characteristic corresponding to each of the plurality of interference signals. It is further to be understood that the filter component 120 can apply the notch filter to a frequency band based upon known interference parameters. For example, if a transmitter having a known narrowband frequency output is known to be in the area of interest scanned by the SAR antenna 104, the filter component 120 can apply the notch filter directly at the known frequency band of the transmitter.

After the filter component 120 applies the notch filter to the frequency band of the spectral characteristic that corresponds to the interference signal, the signal processing component 114 can perform inverse operations to the filtered spectral characteristic. By performing inverse operations on the filtered spectral characteristic, the filter component 120 can return the filtered spectral characteristic to a deramped phase history usable for SAR imaging. The transform component 118 can execute an inverse transform of the frequency-domain transform that the transform component 118 used to generate the spectral characteristic of the reramped phase history. For example, if the transform component 118 executes an FFT over the reramped phase history in order to generate the spectral characteristic, the transform component 118 executes an inverse FFT in order to recover a filtered, ramped phase history from the filtered spectrum. The signal conditioning component 116 receives the filtered, ramped phase history from the transform component 118. The signal conditioning component 116 deramps the filtered, ramped phase history by multiplying the filtered, ramped phase history by the complex conjugate of the scanning radar pulse transmitted by the SAR antenna 104. If the signal conditioning component 116 initially upsampled the input phase history pulse after receiving it from the SAR data system 106, the signal conditioning component 116 downsamples the deramped filtered phase history to an original sampling rate of the input phase history pulse. The deramped filtered phase history can then be received by the SAR imaging component 115, which uses the phase history in connection with generating SAR images of the area of interest scanned by the SAR antenna.

Figure 2:
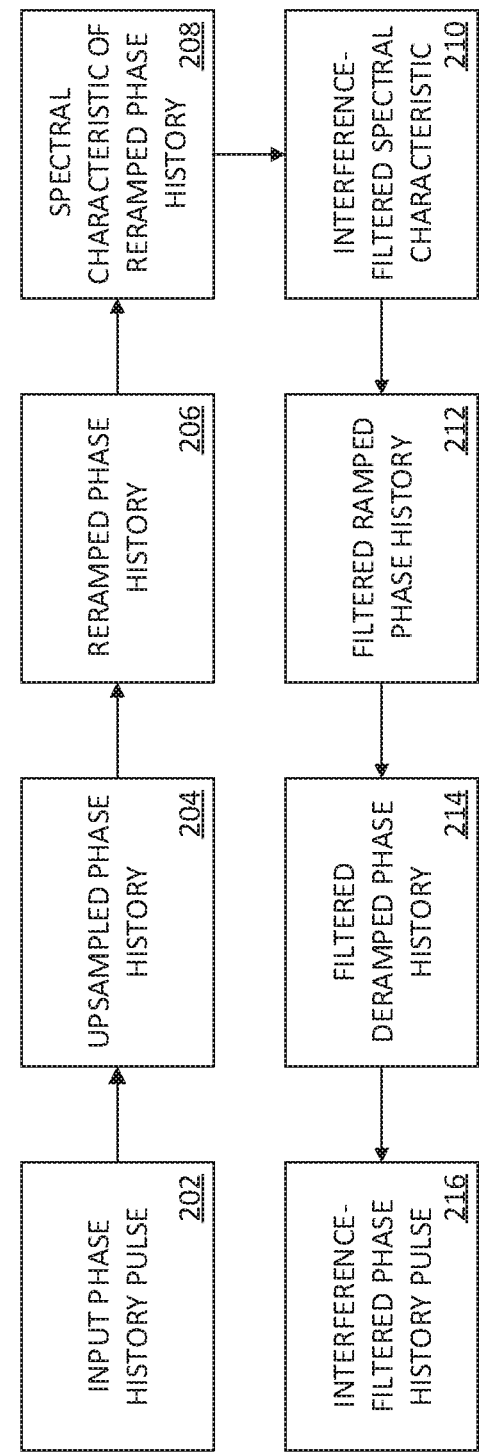
FIG. 2 is an exemplary SAR data flow diagram.

Referring now to FIG. 2, an exemplary data flow diagram 200 for a stretch-processed SAR imagery interference mitigation is illustrated. The flow diagram 200 illustrates a state of a pulse of SAR data at each of a plurality of processing stages during a process for interference mitigation. The SAR data pulse is first received by the signal processing component 114 of the computing system 108 as an input phase history pulse 202. The input phase history pulse 202 comprises a stretch-processed, digitally-sampled version of a signal received by the SAR antenna 104. Thus, the input phase history pulse 202 comprises an echo return component, caused by echo of a signal pulse transmitted by the antenna 104 from terrain and objects in an area of interest, and an interference component, caused by emission of narrowband EM radiation by a transmitter (e.g., radio or television antenna, ground-based radar, etc.). The input phase history pulse 202 can then be upsampled to increase a number of data points for subsequent processing stages, yielding an upsampled phase history 204. The upsampled phase history 204 is then reramped by multiplying the upsampled phase history 204 by a copy of the scanning pulse transmitted by the antenna 104, yielding a reramped phase history 206. A frequency-domain transform is then executed over the reramped phase history 206 to generate a spectral characteristic 208 of the reramped phase history 206. For example, the spectral characteristic 208 comprises a power spectral density of the reramped phase history 206. Since the interference component of the signal received at the SAR antenna 104 is caused by a narrowband EM emission (relative to a bandwidth of the antenna 104), the interference will generally correspond to peaks in the spectral characteristic 208. Frequency bands of the spectral characteristic 208 that correspond to peaks can be identified and notch-filtered. Notch-filtering the spectral characteristic 208 results in an interference-filtered spectral characteristic 210. The filtered spectral characteristic 210 can then be reprocessed in order to return the filtered data to a stretch-processed phase history. An inverse of the frequency domain transform used to generate the spectral characteristic 208 can be executed over the filtered spectral characteristic 210 to determine a filtered, ramped phase history 212. A filtered, deramped phase history 214 can be computed from the filtered, ramped phase history 212 by multiplying the phase history 212 by the complex conjugate of the chirped pulse transmitted by the SAR antenna 104. The filtered, deramped phase history 214 can then be downsampled by the signal conditioning component 116 to a sampling rate of the original input phase history pulse 202. The signal conditioning component 116 thus outputs an interference-filtered stretch-processed phase history pulse 216.

Figure 3:
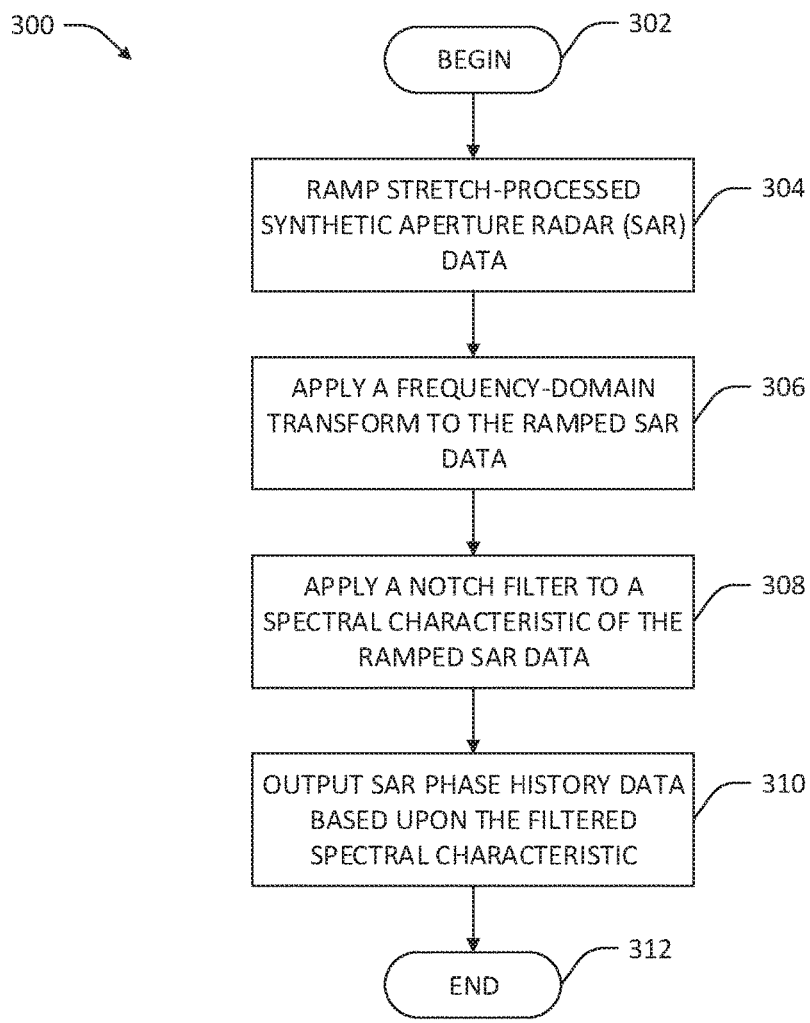
FIG. 3 is a flow diagram that illustrates an exemplary methodology for mitigating interference in stretch-processed SAR data.

FIG. 3 illustrates an exemplary methodology relating to mitigating interference in stretch-processed SAR data caused by narrowband EM emitters. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 3, a methodology 300 that facilitates mitigation of interference in stretch-processed SAR data is illustrated. The methodology 300 begins at 302, and at 304 stretch-processed SAR data is ramped. The stretch-processed SAR data comprises a deramped radar return that includes signal contributions from an echo return of the radar and at least one emitter of EM interference in a collection area of the radar. The interference can be, for example, an EM emission received from a television or FM radio transmission tower. The stretch-processed SAR data is ramped at 304 by multiplying the stretch-processed SAR data by a copy of a pulse transmitted by a SAR antenna used to gather the SAR data. Ramping the stretch-processed SAR data removes a frequency-variant component of the interference signal caused by stretch-processing. A frequency-domain transform, such as an FFT, is then applied to the ramped SAR data at 306 to generate a spectral characteristic of the ramped SAR data. The spectral characteristic of the ramped SAR data can be indicative of a power spectral density of the ramped SAR data. Since the ramping process introduces a chirp term to the echo return of the radar and removes a chirp term from the interference signal, as described in greater detail above, the spectral characteristic has peaks at frequency bands corresponding to narrowband interference signals. A notch filter is applied at 308 to the spectral characteristic of the ramped SAR data at the frequency bands corresponding to the peaks of the spectral characteristic. At 310 SAR phase history data is output based upon the filtered spectral characteristic (e.g., after applying an inverse frequency-domain transform to the filtered spectral characteristic and deramping a resultant phase history), whereupon the methodology 300 ends at 312.

Referring now to FIG. 4, a high-level illustration of an exemplary computing device 400 that can be used in accordance with the systems and methodologies disclosed herein is illustrated. For instance, the computing device 400 may be used in a system that gathers or processes SAR data. By way of another example, the computing device 400 can be used in a system that facilitates presentment of SAR imagery to a user. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store SAR phase history data, spectral characteristic data, etc.

The computing device 400 additionally includes a data store 408 that is accessible by the processor 402 by way of the system bus 406. The data store 408 may include executable instructions, SAR data, spectral characteristic data, collection parameters for a SAR antenna etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc. by way of the output interface 412.

It is contemplated that the external devices that communicate with the computing device 400 via the input interface 410 and the output interface 412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
at least one processor; and
memory comprising instructions that, when executed by the at least one processor, cause the at least one processor to perform the following acts:
responsive to receiving stretch-processed synthetic aperture radar (SAR) data, ramping the stretch-processed SAR data;
applying a frequency-domain transform to the ramped SAR data to generate a spectral characteristic of the ramped SAR data;
applying a notch filter to a frequency band corresponding to a peak of the spectral characteristic of the ramped SAR data to generate a filtered spectral characteristic of the ramped SAR data; and
outputting SAR phase history data based upon the filtered spectral characteristic.

2. The computing system of claim 1, wherein the frequency-domain transform is a fast Fourier transform (FFT).

3. The computing system of claim 1, wherein ramping the stretch-processed SAR data comprises multiplying the stretch-processed SAR data by a copy of a SAR scanning pulse.

4. The computing system of claim 3, wherein the SAR scanning pulse comprises a variable-frequency chirp signal.

5. The computing system of claim 1, wherein the peak of the spectral characteristic corresponds to a narrowband electromagnetic (EM) emission.

6. The computing system of claim 5, wherein the narrowband EM emission has a bandwidth of less than 20% of a bandwidth of an output of a SAR antenna, wherein the stretch-processed SAR data is based upon a return of the SAR antenna.

7. The computing system of claim 1, the acts further comprising upsampling the stretch-processed SAR data prior to ramping the stretch-processed SAR data.

8. The computing system of claim 7, wherein the upsampling is based upon a bandwidth of a SAR antenna, wherein the stretch-processed SAR data is based upon a return of the SAR antenna.

9. The computing system of claim 1, the acts further comprising:
applying an inverse of the frequency-domain transform to the filtered spectral characteristic to generate filtered ramped SAR phase history data;
deramping the filtered ramped SAR phase history data; and
outputting the deramped SAR phase history data.

10. A method, comprising:
responsive to receiving deramped synthetic aperture radar (SAR) data, reramping the deramped SAR data;
executing a frequency-domain transform over the reramped SAR data;
applying a notch filter at a peak of a spectral characteristic of the reramped SAR data, the spectral characteristic based upon execution of the frequency-domain transform; and
outputting SAR phase history data based upon the notch-filtered spectral characteristic of the reramped SAR data.

11. The method of claim 10, wherein the frequency-domain transform is a fast Fourier transform (FFT).

12. The method of claim 10, wherein reramping the SAR data comprises multiplying the deramped SAR data by a copy of an unramped SAR signal.

13. The method of claim 12, wherein the unramped SAR signal comprises a variable-frequency chirp signal.

14. The method of claim 10, wherein the peak of the spectral characteristic of the reramped SAR data corresponds to a narrowband electromagnetic (EM) emission.

15. The method of claim 14, wherein the narrowband EM emission has a bandwidth of less than 20% of a bandwidth of a SAR scanning pulse emitted by a SAR antenna, wherein the deramped SAR data is based upon a return of the SAR antenna.

16. The method of claim 10, further comprising upsampling the deramped SAR data prior to reramping the deramped SAR data.

17. The method of claim 16, wherein the upsampling is based upon a collection bandwidth of a SAR antenna, the deramped SAR data based upon data output by the SAR antenna.

18. The method of claim 10, wherein outputting SAR phase history data based upon the notch-filtered spectral characteristic of the reramped SAR data comprises:
executing an inverse frequency-domain transform over the notch-filtered spectral characteristic of the reramped SAR data;
deramping the inverse-transformed data to obtain the SAR phase history data; and
outputting the SAR phase history data.

19. A non-transitory computer-readable medium comprising instructions that, when executed by a processor, perform the following acts:
responsive to receiving stretch-processed synthetic aperture radar (SAR) data, ramping the stretch-processed SAR data;
executing a Fourier transform over the ramped SAR data;
notch-filtering a frequency band of a power spectral density (PSD) of the ramped SAR data, a magnitude of the PSD in the frequency band being at least two times as large as an average magnitude of the PSD outside the frequency band, the (PSD) based upon the executing of the Fourier transform; and
outputting SAR phase history data based upon the notch-filtered PSD of the ramped SAR data.

20. The non-transitory computer-readable medium of claim 19, the acts further comprising outputting a SAR image of a scene based upon the SAR phase history data.

* * * * *